C. WARNER.
Pipe Coupling.

No. 6,428.

Patented May 8, 1849.

UNITED STATES PATENT OFFICE.

CHAPMAN WARNER, OF LOUISVILLE, KENTUCKY.

LUG AND LINK FOR CONNECTING PIPES.

Specification of Letters Patent No. 6,428, dated May 8, 1849.

*To all whom it may concern:*

Be it known that I, CHAPMAN WARNER, of Louisville, county of Jefferson, and State of Kentucky, have invented a new and Improved Mode of Connecting Metallic Pipes; and I do hereby declare that the following is a full and exact description, reference being had to the annexed drawings, making part of this specification.

Figure 1:
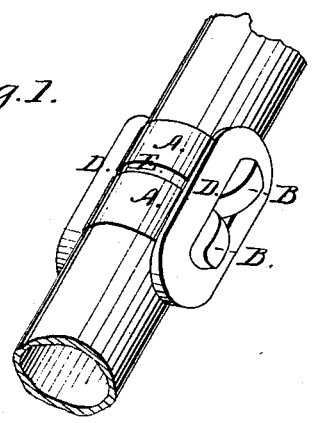
Figure 2:
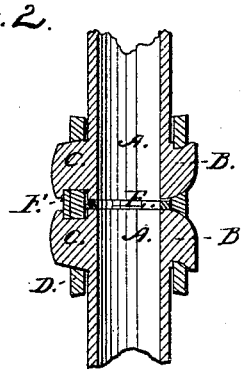

Figure 1 is a perspective view of two ends of pipe connected by links or hasps upon horns or lugs made of proper shape to receive them and more clearly shown in Fig. 2, which are transverse sections.

A A, are the pieces of pipe; B B, are two horns, or lugs, a little hooked or curved on the sides farthest from each other.

C C, are two horns or lugs, so formed that one of the links or hasps D placed over them and brought down to the surface of the pipe, the other link or hasp D being on the horns B B, the two pieces of pipe are brought into a straight line at the same time the joint made perfectly tight by the wedge shape given to the horns C C. A gasket E of some yielding substance being interposed between the ends of pipe A A, or this may be made to fit tight by turning and grinding, in which case it would be more suitable to make all the horns in the form of C C. The link or hasp D that is placed over the horns C C should be secured by a key F when the pipe would be liable to jar.

Figure 3:
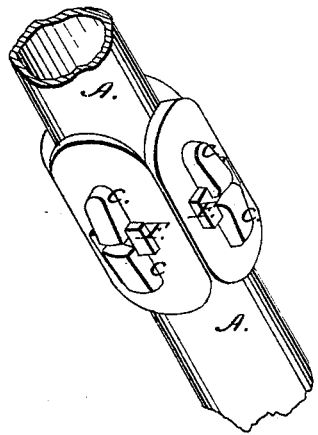

When the pipe to be connected is large, more than two pair of horns may be used as in Fig. 3 and they should all be in the form of C C. A groove in the ends of the pipe would be a good security against the gasket forcing out or drawing in, and that groove made with a tool for that purpose would be more perfect than could well be cast in it. It will be obvious that this mode of connecting pipe at the same time that it is very economical, can be done with great facility and dispatch.

I do not claim as my invention the horns or lugs and links or hasps simply to hold the ends of pipe together as they have been used before, but

I claim—

The hooked form of the horns B B and the wedge like form of the horns C C by which the links or hasps D when applied to the said horns are made to perform in a speedy and cheap way the work of screw bolts in making a tight joint substantially as above described for which I desire Letters Patent.

CHAPMAN WARNER.

Witnesses:
J. B. WOODRUFF,
W. J. DONOHOO.